United States Patent [19]

Al Ghatta

[11] Patent Number: 5,376,734
[45] Date of Patent: Dec. 27, 1994

[54] PROCESS FOR THE PRODUCTION OF HIGH MOLECULAR WEIGHT POLYESTER RESINS

[75] Inventor: Hussain A. K. Al Ghatta, Fiuggi, Italy

[73] Assignee: M. & G. Ricerche S.p.A., Pozzilli, Italy

[21] Appl. No.: 74,865

[22] PCT Filed: Oct. 15, 1992

[86] PCT No.: PCT/EP92/02375
§ 371 Date: Jun. 11, 1993
§ 102(e) Date: Jun. 11, 1993

[87] PCT Pub. No.: WO93/08226
PCT Pub. Date: Apr. 29, 1993

[30] Foreign Application Priority Data

Oct. 18, 1991 [IT] Italy .......................... MI91A002759

[51] Int. Cl.5 .............................................. C08F 20/00
[52] U.S. Cl. .................................... 525/437; 528/272; 528/296; 528/302; 528/308; 528/353; 528/481; 528/486; 528/503; 264/328.1; 264/239
[58] Field of Search ............... 525/437; 528/353, 481, 528/486, 503, 272, 296, 302, 308; 264/328.1, 239

[56] References Cited

FOREIGN PATENT DOCUMENTS

PCT/EP92/-
00667 10/1992 WIPO .
PCT/EP92/-
00668 10/1992 WIPO .
PCT/EP92/-
00669 10/1992 WIPO .
PCT/EP92/-
00670 10/1992 WIPO .

*Primary Examiner*—Samuel A. Acquah
*Attorney, Agent, or Firm*—Edward D. Manzo; Andrew G. Kolomayets

[57] ABSTRACT

A process for the production of polyester resins having an intrinsic viscosity higher than 0.57 dl/g from polyester resins having intrinsic viscosities of lower than 0.57 dl/g in which 1) a melt of the polyester resin having an intrinsic viscosity lower than 0.57 dl/g is mixed with a polyaddition additive containing at least two groups which react with the terminal OH and COOH groups of the resin, 2) the melted mixture is converted into solid particles which are subsequently crystallized at temperatures higher than the Tg of the polyester resin and lower than its melting point, and 3) the particles are heated at temperatures higher than 150° C. but lower than the melting point of the resin to increase the intrinsic viscosity.

14 Claims, No Drawings

PROCESS FOR THE PRODUCTION OF HIGH MOLECULAR WEIGHT POLYESTER RESINS

The present invention refers to an improved process for the production of high molecular weight polyester resins.

More particularly the process of the invention allows to obtain high molecular weight polyesters subjecting to solid state upgrading reaction (SSR) polyesters with values of intrinsic viscosity lower than 0.57 dl/g.

The formed articles from polyalkylenterepthalate show several valuable characteristics such as high mechanical properties, solvent resistance and transparency.

Several technologies are used for the preparation of the formed articles. Some of them, particularly the blow molding technique require that the viscosity of polyester resin in the molten state be sufficiently high (10.000 poises or more) to avoid that the preforms collapse or break during the preforming stage.

Polyester resins having so high viscosity values in the molten state are difficult to prepare with the conventional melt polycondensation processes.

Polyethyleneterephthalate (PET) bottle grade is prepared with a two steps process wherein in the first step terepthalic acid and ethyleneglycol are polycondensed in the melt (MPC) to obtain a polymer with intrinsic viscosity not less than 0.57-0.6 dl/g and then the polymer (previous crystallization treatment) is subjected to polycondensation in the solid state (SSPC) to obtain the desired intrinsic viscosity value (0.75-0.9 dl/g).

The SSPC upgrading generally shows very low kinetics.

Recently there has been described a solid state upgrading process by polyaddition reaction (SSPA) characterized by high upgrading kinetics (European application 0422282). The European application does not disclose however, that the upgrading treatment can be usefully applied to resins with relatively low intrinsic viscosity, lower than the value of 0.57 dl/g of some of the resins used in the examples.

The possibility of obtaining high molecular weight polyester resins starting from resins with relatively low intrinsic viscosity values, lower than those up to now used presents remarkable advantages, the main of which is represented by a significant increase of the production capacity of the plant. It is indeed known that the polycondensation kinetics in the melt depends on the rate of removal of the volatile by-products (ethylenglycol); the rate of removal in turn depends on the melt viscosity; higher is the latter more difficult is the removal.

The possibility of using a polyester resin with relatively low values of intrinsic viscosity allows to operate in the melt with remarkably reduced intrinsic viscosity and significantly lowers therefore the duration of the polycondensation reaction. There are limits however to the decrease of the polymer intrinsic viscosity during the MPC step. By decreasing I.V., increases the content of oligomers; during the upgrading step cyclic compounds are released which reduce the flowability of granules and lead to line stoppages. These phenomena negatively influence the possibility of the regular plant operation. In the very severe situations it is also possible to arrive to the stop of the plant. This is due to the formation of blocks of sintered material which prevents the regular plant operation. It is for this reason that, in the MPC step, the prepared polyester resin has I.V. not less than 0.57-0.6 dl/g.

It has been now unexpectedly found that it is possible to overcome the drawbacks mentioned above and prepare polyester resins with I.V. higher than 0.7 dl/g starting from resins with I.V. less than 0.57 dl/g. The process of the invention comprises the following stages:

a) preparation of a polyester resin with I.V. values not higher than 0.57 dl/g by melt polycondensation of an alkandiol with an aromatic bicarboxylic acid, preferably with terepthalic acid or with a dialkylterepthalate;

b) melt mixing the polyester resin with I.V. less than 0.57 dl/g with an additive of molecular weight extension (upgrading) containing at least two groups capable of addition reactions with the terminal OH and COOH groups of polyester resin (polyaddition additive);

c) conversion of the mixed molten mixture into solid particles and then crystallization treatment of the particles;

d) heating the solid particles at temperatures higher than 150° C. up to obtain the desired increase of polymer intrinsic viscosity.

The polyester resins to which the process of the invention is applied are formed of the products of polycondensation of an alkandiol with 2-10 carbon atoms such as ethylenglycol and 1,4-butylenglycol, with aromatic bicarboxylic acids or their reactive derivatives preferably selected among terepthalic acid and alkylenterepthalates.

In the case of polyalkylenterepthalates, besides the units deriving from terepthalic acid, units can be present deriving from other bicarboxylic acids such as naphtalendicarboxylic acids, pthalic and isophtalic acids in amounts up to 20% by mols on the total of acid units.

Polyethylenterephtalate (PET) and copolyethylenterepthalates containing up to 20% by mols of units deriving from isophtalic acid (COPET) are the preferred resins.

The method suitable for preparing the polyester resins are well known in the literature (see for example U.S. Pat. Nos. 3,047,539 and 2,465,319 and Encyclopedia of Polymer Science and Engineering—Second Edition—vol. 12, pp. 132–135; 217–225, (1988), the descriptions of which are herewith incorporated for reference).

The procedure generally adopted consists in the melt polycondensation of an excess of an alkandiol with the bicarboxylic acid or with its reactive derivatives.

In the case of the polyalkylenterepthalates two are the methods generally followed: one consisting in the transesterification between the diol and a dialkylterepthalate to form the corresponding diol- diester and low molecular weight oligomers and in their subsequent melt polycondensation; the other one consisting in the direct esterification between terephtalic acid and the selected diol. The last method is currently the most used due to the recent development of methods of preparation of sufficiently pure terepthalic acid. The direct esterification between terephtalic acid and the glycol is preferably catalyzed with compounds like manganese acetate and tertiary amines.

The subsequent stage of polycondensation is carried out at temperatures between about 270° C. and 290° C. operating under vacuum and catalyzing the reaction with compounds such as Sb trioxide and Ge bioxide. The polyester prepared in stage a) has intrinsic viscosity less than 0.57 dl/g and preferably comprised between 0.40 and 0.55 dl/g. The mixing b) may be carried out using any mixing apparatus.

It is preferred to use counter-rotating and non-intermeshing twin screw extruders because the same do not develop excessive shear forces which could cause polymer degradation.

The residence time in the twin extruders above indicated is generally less than 180 seconds; times of 15-25 seconds may be sufficient to obtain a homogeneous mixing.

Mixers of the static type can also be used in this case the resistance time is not higher than 180 seconds to the aim of obtaining a controlled mixing. A static mixer is generally formed of a pipe containing fixed obstacles arranged in such a way as to favour the subdivision of the flow and the subsequent recombination in an order different from the starting one.

The mixing can be carried out applying the vacuum; this to favour the kinetic of the polymer upgrading when it is desired to obtain also a partial I.V. increase with respect to the final desired value. As already explained the mixing stage can be carried out under conditions to obtain, besides the homogeneous mixing of the additive, also an increase of the polymer intrinsic viscosity.

These increases however do not exceed 70-80% of the final viscosity value; the completion of the increase is obtained in the solid state upgrading stage d) wherein it is possible to better control the various reactions to which the polymer is subjected.

The temperature of the solid state upgrading being remarkably lower than the one of the phase in the melt allows to reduce or eliminate the degradation reactions and other undesired reactions which may occur in the melt.

The mixing temperature is generally comprised between 250° and 310°; it is possible to operate under vacuum or without vacuum.

The additive used in stage b) is, as indicated, a compound with at least two groups capable of addition reactions with the terminal groups OH/COOH of the polyester resin.

Surprisingly, this additive allows to obtain after the mixing operation in the melt, a still reactive polymer i.e. capable of upgrading and/or branching reactions in the subsequent treatment in the solid state.

This result is unexpected if one considers the high reactivity of the additives under the conditions used in the mixing stage in the melt (low molecular weight polyester containing oligomers and high mixing temperatures).

For example a copolyethylenterepthalate containing 15% by weight of units from isopthalic acid and with I.V. of 0,474 dl/g contains 130 eq/ton of OH groups.

The extractability of this polymer in chlorophorm is high due to the remarkable oligomer fraction therein contained.

The "reactive" polymer coming from stage a) in the subsequent solid state treatment prevailingly brings about causes upgrading reactions operating at temperatures lower than about 185° C., upgrading and possibly branching reactions operating at higher temperatures.

Controlling the treatment conditions in the solid state it is therefore possible to prepare "taylor made" polymers suitable for the desired final applications. Illustrative examples of usable polyaddition additives are the dianhydrides of tetracarboxylic acids, preferably aromatic acids, and the iso and polyisocyonates. The pyromellitic anhydride is the preferred dianhydride. Other useable dianhydrides are 4,4'-oxydiphtalo anhydride; dianhydride of 3,4,3',4',-diphenylentetracarboxylic acid; dianhydride of 3,3',4,4',-benzophenon tetracarboxylic acid; dianhydride of 1,2,3,4,-cyclo butantetracarboxylic acid, dianhydride of bicyclo, [2,2,2]7-octen-2,3,5,6-tetracarboxylic acid.

An example of polyisocyanate is polymeric diphenylmethan-4,4'-diisocyanate.

The amount of additive is generally less than 2% by weight on the polyester resin.

The preferred quantity is comprised between 0.05 and more preferably between 0.1 and 0.5% by weight. The additive is added to the resin according to the conventional methods. The resin is granulated in stage c) using conventional apparatus.

The subsequent crystallization treatment is carried out at temperatures higher than the Tg of polymer and lower than the melting point. An indicative temperature is 130°-150° C. with resistance times of 20-60 minutes.

The crystallization of polymer particles is necessary to avoid agglomeration phenomena and sticking of granules during the upgrading stage.

The upgrading stage d) is carried out at temperatures comprised between about 150° and 210° C. Thanks to the fact that the additive used in b) is a compound that reacts with addition reactions with the terminal groups of the polyester resin, the reaction kinetic is favoured and the resistance times are reduced with respect to those necessary in the polycondensation upgrading processes.

Operating in the range between 150° C. and about 185° C. (wherein reactions of linear upgrading occur prevailingly by addition of the additive to the terminal groups of the polyester resin) it is possible to use dry air as fluidizing gaseous stream; using temperatures higher than about 185° C. wherein polycondensation reactions may also occur, it is convenient to use an inert gas, preferably nitrogen.

The possibility moreover of using relatively low upgrading temperatures allows to use polyester resins with low melting point such as copolyethylenterepthalate (COPET) containing from 5 to 20% of units of isophtalic acid on the total of acid units, having relatively low melting points (less than 200° C.) which cannot be used with the previous polycondensation upgrading processes.

The process of the invention may be carried out continuously without interruption between the stage a) of production of the polyester and the one of mixing the polyester with the polyaddition additive.

The extruder or the apparatus used in stage b) can also be fed with granules coming from another plant. Polyester resins different in nature and properties can be fed to stage b) thus obtaining compositions having properties depending on the fed polymers. The melt leaving stage b) is granulated in continuous in granulating apparatus of known type. The stages of crystallization and upgrading are preferably carried out continuously feeding the polyester granules to the crystallization and upgrading sections upstream with a stream of a heated gas such as for example air or an inert gas as nitrogen, carbon dioxide or others. The recycling of the gas is carried out, in particular, according to the method described in European application 86830340.5. Conventional additives can be incorporated into the polyester resin. The additives comprise stabilizers, antioxydants, plasticizers, lubricants, dyestuffs, pigments, flameretarders.

The polyester resins are suitable for any application; they are particularly suitable for extrusion and injection - blow molding applications.

Using the process of the invention, the final properties of the polyester resin can be controlled in function of the desired application.

The following examples are given to illustrate and not to limit the invention.

EXAMPLE 1

30 kg/h of melt PET (I.V.=0.408 dl/g) having a content of terminal carboxylic groups of 7.8 eq/ton were fed in continuous from a pilot plant of melt polycondensation of PET to a counter-rotating non-intermeshing twin extruder with venting capabilities.

The extruder was also continuously fed with 300 g/h of a mixture of 20% by weight of pyromellitic dianhydride in a powder of crystallized PET (I.V. of PET=0.4 dl/g). The test conditions were as follows:
concentration of pyromellitic anhydride in melt PET=0.6 % by weight;
screw speed=450 RPM;
screw ratio length/diameter=(LID)=24;
barrel temperature=282° C.;
temperature of the melt polymer=260°–295° C.;
average resistance time=18–25 seconds;
vacuum=15–17 torr.

The melt polymer was pelletized in a strand pelletizer.

The chips had a cylindrical shape with a diameter of 5 mm. The chips intrinsic viscosity was 0.62 dl/g±0.07; the acetaldehyde content was 3–3.5 ppm; the melting point (DSC) was 252° C.

The chips were then continuously fed to a crystallization and upgrading plant using a gas recycle according to the method of European application EP 86830340.5. The crystallization temperature was 130°–140° C.; the resistance time 0.5 hours.

The upgrading temperature was 170° C. and the resistance time 12 hours.

The upgrading operation was carried out in a flow of dry air.

The intrinsic viscosity of polymer was 0.78 I 0.02 dl/g. The plant ran without difficulties and interruptions due to stoppage problems, for a sufficiently long period (5 days) after which the test was stopped.

The polymer was gel-free and with a content of acetaldehyde of 0.3 ppm; it was stretched blow moulded to form bottles.

EXAMPLE 2

The test of example 1 was repeated with the only difference that no vacuum was applied to the extruder.

The intrinsic viscosity of chips was 0.58±0.018 dl/g and the acetaldehyde content of 18.5 ppm. The intrinsic viscosity after upgrading was 0.79±0.018 dl/g. The acetaldehyde content was 0.5 ppm. The upgrading plant ran continuously and without interruptions for a period of 4 days after which the test was stopped.

EXAMPLE 3

The test of example 1 was repeated with the only difference that to the twin extruder a melt copolyethylenterepthalate was fed with a content of 15% by weight of units from isophtalic acid and with melting point (DSC) of 215° C. and with intrinsic viscosity of 0.52 dl/g and content of terminal carboxyl groups of 7.2 eq/ton.

In table 1 are reported the data of intrinsic viscosity after the various steps and the acetaldehyde content in the final product in relation with the concentration of pyromellitic dianhydride in the melt and the upgrading temperature.

The duration of the upgrading operation was of 12 hours in any test.

The upgrading plant ran continuously without interruptions for a period of 5 days.

Analytical determinations

The intrinsic viscosity was determined on a solution of 0.5 g polyester chips in 100 ml of a 60/40 by weight mixture of phenol and tetrachloethane at 25° C., according to ASTM D 4603-85.

The content of acetaldehyde was determined according to ASTM D 4526-85 using a Perking Elmer 8700 chromotograph.

TABLE 1

| Test No. | I.V. after mixing in the melt (dl/g) | Temp. °C. | Solid state upgrading I.V. upgraded polymer (dl/g) | acetaldehyde content (ppm) |
|---|---|---|---|---|
| 0.1% by weight of pyromellitic dianhydride | | | | |
| 3.1 | 0.61 | 160 | 0.67 | 0.4 |
| 3.2 | 0.61 | 176 | 0.76 | 0.4 |
| 3.3 | 0.61 | 185 | 0.82 | 0.35 |
| 0.2% by weight of pyromellitic dianhydride | | | | |
| 3.4 | 0.65 | 160 | 0.77 | 0.34 |
| 3.5 | 0.65 | 176 | 0.86 | 0.34 |
| 3.6 | 0.65 | 185 | 0.982 | 0.34 |
| 0.3% by weight of pyromellitic dianhydride | | | | |
| 3.7 | 0.69 | 160 | 0.835 | 0.45 |
| 3.8 | 0.69 | 176 | 1.01 | 0.45 |
| 3.9 | 0.69 | 189 | 1.4 | 0.45 |

I claim:
1. Process for the production of polyester resins having an intrinsic viscosity higher than 0.57 dl/g starting from polyester resins with an intrinsic viscosity lower than 0.57 dl/g comprising the following steps:
  1) mixing in a melt a polyester resin having an intrinsic viscosity lower than 0.57 dl/g with 0.05 to 2 wt % of a polyaddition additive containing at least two groups which react by addition reactions with the terminal OH or COOH groups of the resin;
  2) converting the melted mixture into solid particles and subsequently crystallizing the particles at temperatures higher than the Tg of the polyester resin and lower than its melting point;
  3) heating the particles at temperatures higher than 150° C. but lower than the melting point of the resin to increase the intrinsic viscosity.

2. Process according to claim 1, wherein the starting polyester resin has intrinsic viscosity comprised between 0.4 and 0.55 dl/g.

3. Process according to claim 1, or 2, wherein the mixing in the melt of the polyester resin and polyaddition additive is carried out at temperatures comprised between 250° and 310° C. and with residence times lower than 180 sec.

4. Process according to claim 1 or 2 wherein the heating treatment in the solid state is carried out at temperatures between 150° C. and 210° C.

5. Process according to claim 4 wherein the intrinsic viscosity is increased up to 70–80% of the final value obtained in the stage 3) of heating in the solid state.

6. Process according to claim 3 wherein the mixing in the melt of the polyester resin and the polyaddition additive is carried out with a counter-rotating non-intermeshing twin extruder.

7. Process according to claim 1 or 2, wherein the polyaddition additive is selected from the dianhydrides of tetracarboxylic acids.

8. Process according to claim 7, wherein the dianhydride is pyromellitic dianhydride.

9. Process according to claim 8, wherein the dianhydride is used in amounts up to 1% by weight.

10. Process according to claim 8, wherein the polyester is selected among polyethyleneterephthalate and copolyethyleneterephthalate containing up to 20% by weight of units derived from isophtalic acid.

11. Process according to claim 10, including the step of continuously feeding a polyester resin coming from a melt polycondensation production plant, said resin having an intrinsic viscosity lower than 0.57 dl/g.

12. Reactive polyester resins having an intrinsic viscosity equal or higher than 0.57 dl/g obtained by mixing in the melt a polyester resin having an intrinsic viscosity lower than 0.57 dl/g with a polyaddition additive having at least two groups which react by addition reactions with the terminal OH/COOH groups of the polyester resin.

13. Polyethyleneterephthalate and copolyethyleneterephthalate containing up to 20 mol % of units derived from isophthalic acid according to claim 12 obtained by mixing in the melt the corresponding polymers having an intrinsic viscosity lower than 0.57 dl/g with pyromellitic dianhydride.

14. Formed articles obtained by injection blow molding and extrusion blow molding of a polyester resin according to claim 12 or 13.

* * * * *

UNITED STATES PATENT AND TRADEMARK OFFICE
CERTIFICATE OF CORRECTION

PATENT NO. : 5,376,734
DATED : December 27, 1994
INVENTOR(S) : Al Ghatta

It is certified that error appears in the above-indentified patent and that said Letters Patent is hereby corrected as shown below:

At column 3, line 54, change "0,474" to --0.474--.

At column 3, line 64, change ""taylor made"" to --taylor-made--.

At column 4, line 13, after the first "and" insert --1%,---.

Signed and Sealed this

Sixteenth Day of May, 1995

*Attest:*

BRUCE LEHMAN

*Attesting Officer*   *Commissioner of Patents and Trademarks*